(12) United States Patent
Barbu et al.

(10) Patent No.: US 12,308,926 B2
(45) Date of Patent: May 20, 2025

(54) APPARATUS FOR SELECTING RADIO BEAMS

(71) Applicant: Nokia Technologies OY, Espoo (FI)

(72) Inventors: Oana-Elena Barbu, Aalborg (DK); Johannes Harrebek, Aalborg (DK); Benny Vejlgaard, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 352 days.

(21) Appl. No.: 17/998,406

(22) PCT Filed: May 12, 2021

(86) PCT No.: PCT/US2021/031954
§ 371 (c)(1),
(2) Date: Nov. 10, 2022

(87) PCT Pub. No.: WO2021/231548
PCT Pub. Date: Nov. 18, 2021

(65) Prior Publication Data
US 2023/0231614 A1    Jul. 20, 2023

(30) Foreign Application Priority Data
May 13, 2020   (EP) .................................... 20174410

(51) Int. Cl.
*H04W 72/51* (2023.01)
*H04B 7/06* (2006.01)
(Continued)

(52) U.S. Cl.
CPC .......... *H04B 7/0695* (2013.01); *H04W 16/28* (2013.01); *H04W 64/00* (2013.01); *H04W 72/51* (2023.01)

(58) Field of Classification Search
CPC .... H04W 72/542; H04W 24/10; H04W 76/28
(Continued)

(56) References Cited

U.S. PATENT DOCUMENTS 5,907,809 A      5/1999   Molnar et al.
10,512,056 B2   12/2019   Stirling-Gallacher et al.
(Continued)

FOREIGN PATENT DOCUMENTS

CN   115812266 A  *  3/2023  ........... H04B 7/0408
EP     3910813 A1 * 11/2021  ........... H04B 7/0408
(Continued)

OTHER PUBLICATIONS

T. O. Olwal, K. Djouani and A. M. Kurien, "A Survey of Resource Management Toward 5G Radio Access Networks, " in IEEE Communications Surveys & Tutorials, vol. 18, No. 3, pp. 1656-1686, thirdquarter 2016, doi: 10.1109/COMST.2016.2550765 (Year: 2016).*
(Continued)

*Primary Examiner* — William D Cumming
(74) *Attorney, Agent, or Firm* — Robert P. Michal, Esq.; Carter, DeLuca & Farrell LLP

(57) ABSTRACT

An access node, method and computer program product for: receiving from a terminal device served by a first access node measurement data relating to a plurality of radio beams, determining that the measurement data comprises data relating to at least one radio beam provided by at least one second access node, receiving information relating to angular coverage of the at least one radio beam provided by at least the second access node, determining, based on the angular coverage and the measurement data relating to the plurality of radio beams, an estimated location of the terminal device, and selecting a set of radio beams for provision to the estimated location of the terminal device, wherein the set of radio beams comprises a subset of radio beams
(Continued)

provided by the first access node for serving the terminal device.

1 Claim, 4 Drawing Sheets

(51) Int. Cl.
  *H04W 16/28* (2009.01)
  *H04W 64/00* (2009.01)
(58) Field of Classification Search
  USPC .......................................................... 370/330
  See application file for complete search history.

(56) References Cited

U.S. PATENT DOCUMENTS

| | | | |
|---|---|---|---|
| 10,588,107 | B2 | 3/2020 | Siomina |
| 11,564,119 | B2 * | 1/2023 | Gürsu ................... H04W 76/28 |
| 11,622,362 | B2 * | 4/2023 | Sen ...................... H04B 7/0695 |
| | | | 370/330 |
| 2019/0044593 | A1 * | 2/2019 | John Wilson ....... H04W 72/542 |
| 2020/0044593 | A1 | 2/2020 | Sun et al. |
| 2020/0145977 | A1 * | 5/2020 | Kumar ................ H04W 56/001 |
| 2020/0344776 | A1 * | 10/2020 | Sen ...................... H04B 7/0413 |
| 2022/0303806 | A1 * | 9/2022 | Gürsu ................... H04W 24/10 |
| 2023/0224750 | A1 * | 7/2023 | Du ....................... H04B 17/254 |
| | | | 370/329 |
| 2023/0231614 | A1 * | 7/2023 | Barbu ................. H04B 7/0695 |
| | | | 370/330 |
| 2024/0276430 | A1 * | 8/2024 | Yilmaz ................. G01S 5/0236 |

FOREIGN PATENT DOCUMENTS

| | | | | | |
|---|---|---|---|---|---|
| JP | 2002319894 | A | * | 10/2002 | ........... H04W 16/24 |
| JP | 3618719 | B2 | * | 2/2005 | ........... H04W 16/24 |
| RU | 2284043 | C1 | * | 9/2006 | |
| RU | 2649897 | C1 | * | 4/2018 | |
| RU | 2654495 | C1 | * | 5/2018 | |
| WO | WO-2018028960 | A1 | * | 2/2018 | ........... H04B 7/0491 |
| WO | WO-2020/006769 | A1 | | 1/2020 | |
| WO | WO-2021/032267 | A1 | | 2/2021 | |
| WO | WO-2021231548 | A1 | * | 11/2021 | ........... H04B 7/0408 |

OTHER PUBLICATIONS

"3rd Generation Partnership Project; Technical Specification Group Radio Access Network; Study on requirements for NR beyond 52.6 GHZ (Release 16)", 3GPP TR 38.807, V16.0.0, Dec. 2019, pp. 1-68.
Maccartney et al., "Millimeter-Wave Base Station Diversity for 5G Coordinated Multipoint (COMP) Applications", IEEE Transactions on Wireless Communications, vol. 18, No. 7, Jul. 2019, pp. 3395-3410.
Kumar et al., "Blockage-aware Reliable mmWave Access via Coordinated Multi-point Connectivity", arXiv, Feb. 13, 2021, pp. 1-15.
Ghadikolaei et al., "Millimeter wave cellular networks: A MAC layer perspective", IEEE Transactions on Communications, vol. 63, No. 10, Oct. 2015, pp. 3437-3458.
"Msc-generator", Sourceforge, Retrieved on Dec. 11, 2023, Webpage available at : https://sourceforge.net/projects/msc-generator/.
Extended European Search Report received for corresponding European Patent Application No. 20174410.9, dated Sep. 21, 2020, 9 pages.
International Search Report for International Application No. PCT/US2021/031954 dated Jul. 11, 2021.
Orikumhi Igbafe et al: "Location-Aware Coordinated Beam Alignment in mmWave Communication", 2018 56th Annual Allerton Conference On Communication, Control, and Computing (Allerton), IEEE, Oct. 2, 2018 (Oct. 2, 2018), pp. 386-390, XP033515522, DOI: 10.1109/ALLERTON.2018.8635826 [retrieved on Feb. 5, 2019].
Office Action for European Application No. 20 174 410.9 dated Jul. 7, 2023.

* cited by examiner

APPARATUS FOR SELECTING RADIO BEAMS

CROSS-REFERENCE TO RELATED APPLICATIONS

This application is a national phase under 35 U.S.C. § 371 of PCT International Application No. PCT/US2021/031954 which has an International filing date of May 12, 2021, which claims priority to European Patent Application No. 20174410.9, filed May 13, 2020, the entire contents of each of which are hereby incorporated by reference.

TECHNICAL FIELD

The present application relates generally to an apparatus for selecting radio beams. More specifically, the present application relates to an apparatus for selecting a set of radio beams.

BACKGROUND

The amount of data increases constantly due to new ways of using user equipment such as streaming content. As a consequence, also users' expectations constantly rise in terms of speed of wireless connections and/or low power consumption of communication devices.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an access node comprising means for performing: receiving from a terminal device served by a first access node measurement data relating to a plurality of radio beams, determining that the measurement data comprises data relating to at least one radio beam provided by at least one second access node, receiving information relating to angular coverage of the at least one radio beam provided by the at least one second access node, determining, based on the angular coverage and the measurement data relating to the plurality of radio beams, an estimated location of the terminal device, and selecting a set of radio beams for provision to the estimated location of the terminal device, wherein the set of radio beams comprises a subset of radio beams provided by the first access node for serving the terminal device.

According to a second aspect of the invention, there is provided a method comprising receiving from a terminal device served by a first access node measurement data relating to a plurality of radio beams, determining that the measurement data comprises data relating to at least one radio beam provided by at least one second access node, receiving information relating to angular coverage of the at least one radio beam provided by the at least one second access node, determining, based on the angular coverage and the measurement data relating to the plurality of radio beams, an estimated location of the terminal device, and selecting a set of radio beams for provision to the estimated location of the terminal device, wherein the set of radio beams comprises a subset of radio beams provided by the first access node for serving the terminal device.

According to a third aspect of the invention, there is provided a computer program comprising instructions for causing an access node to perform at least the following: receiving from a terminal device served by a first access node measurement data relating to a plurality of radio beams, determining that the measurement data comprises data relating to at least one radio beam provided by at least one second access node, receiving information relating to angular coverage of the at least one radio beam provided by the at least one second access node, determining, based on the angular coverage and the measurement data relating to the plurality of radio beams, an estimated location of the terminal device, and selecting a set of radio beams for provision to the estimated location of the terminal device, wherein the set of radio beams comprises a subset of radio beams provided by the first access node for serving the terminal device.

According to a fourth aspect of the invention, there is provided an access node comprising at least one processor and at least one memory including computer program code, the at least one memory and the computer program code configured to with the at least one processor, cause the access node at least to: receive from a terminal device served by a first access node measurement data relating to a plurality of radio beams, determine that the measurement data comprises data relating to at least one radio beam provided by at least one second access node, receive information relating to angular coverage of the at least one radio beam provided by the at least one access node, determine, based on the angular coverage and the measurement data relating to the plurality of radio beams, an estimated location of the terminal device, and select a set of radio beams for provision to the estimated location of the terminal device, wherein the set of radio beams comprises a subset of radio beams provided by the first access node for serving the terminal device.

According to a fifth aspect of the invention, there is provided a non-transitory computer readable medium comprising program instructions for causing an access node to perform at least the following: receiving from a terminal device served by a first access node measurement data relating to a plurality of radio beams, determining that the measurement data comprises data relating to at least one radio beam provided by at least one second access node, receiving information relating to angular coverage of the at least one radio beam provided by the at least one second access node, determining, based on the angular coverage and the measurement data relating to the plurality of radio beams, an estimated location of the terminal device, and selecting a set of radio beams for provision to the estimated location of the terminal device, wherein the set of radio beams comprises a subset of radio beams provided by the first access node for serving the terminal device.

According to a sixth aspect of the invention, there is provided a computer readable medium comprising program instructions for causing an access node to perform at least the following: receiving from a terminal device served by a first access node measurement data relating to a plurality of radio beams, determining that the measurement data comprises data relating to at least one radio beam provided by at least one second access node, receiving information relating to angular coverage of the at least one radio beam provided by the at least one second access node, determining, based on the angular coverage and the measurement data relating to the plurality of radio beams, an estimated location of the terminal device, and selecting a set of radio beams for provision to the estimated location of the terminal device, wherein the set of radio beams comprises a subset of radio beams provided by the first access node for serving the terminal device.

According to a seventh aspect of the invention, there is provided a terminal device comprising at least one processor and at least one memory including computer program code, the at least one memory and the computer program code configured to with the at least one processor, cause the terminal device at least to: measure signals relating to a plurality of radio beams, transmit a set of data relating to the plurality of radio beams to at least one access node, estimate a direction of an arrival path of radio beams provided by the at least one access node, and select a subset of radio beams provided by the at least one access node.

According to an eight aspect of the invention, there is provided a method comprising measuring signals relating to a plurality of radio beams, transmitting a set of data relating to the plurality of radio beams to at least one access node, estimating a direction of an arrival path of radio beams provided by the at least one access node, and selecting a subset of radio beams provided by the at least one access node.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to radio beam management that may enable speeding up a beam alignment process between a terminal device and an access node and reducing a risk of interference.

According to an example embodiment, an access node is configured to receive from a terminal device served by a first access node measurement data relating to a plurality of radio beams, determine that the measurement data comprises data relating to at least one radio beam provided by at least one second access node, receive information relating to angular coverage of the at least one radio beam provided by the at least one access node, determine, based on the angular coverage and the measurement data relating to the plurality of radio beams, an estimated location of the terminal device, and select a set of radio beams for provision to the estimated location of the terminal device, wherein the set of radio beams comprises a subset of radio beams provided by the first access node for serving the terminal device.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
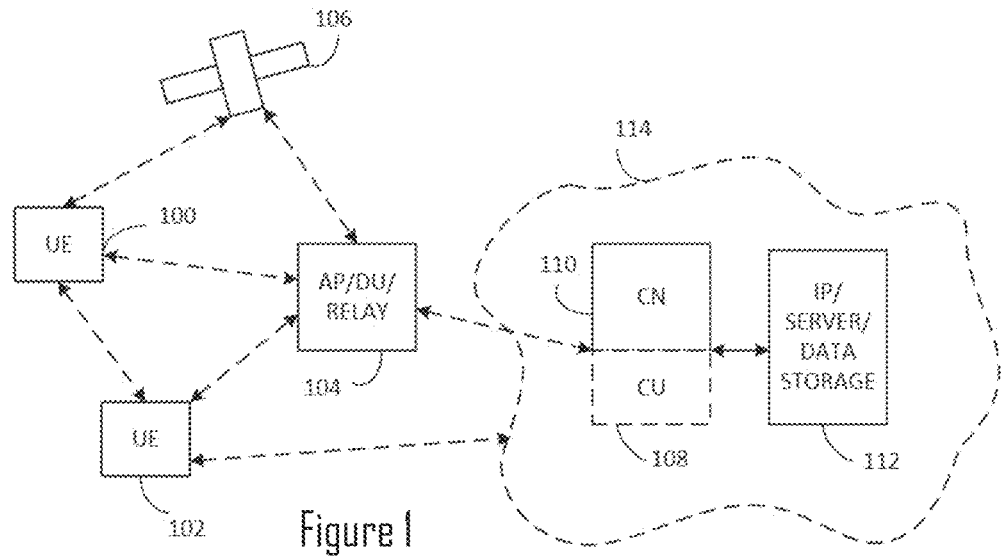
FIG. 1 shows a part of an exemplifying radio access network in which examples of disclosed embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system may comprise more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The (e/g) NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The plurality of antennas or antenna elements may be co-located or distributed. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device refers, for example, to a wireless mobile communication device operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, navigation device, vehicle infotainment system, and multimedia device, or any combination thereof. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of content delivery use cases and related applications including, for example, video streaming, audio streaming, augmented reality, gaming, map data, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which may be installed within an operator's network may aggregate traffic from a large number of HNBs back to a core network.

As commonly known in connection with wireless communication systems, control or management information is transferred over a radio interface, e.g. between the terminal device 100 and the access node 104.

Wireless networks are configured to transmit data through radio beams. A radio beam provides an operating channel for transmitting data between a terminal device such as user equipment and a base station such as a gNodeB. A radio beam may be formed, for example, by a phased array antenna that comprises a plurality of antenna elements that are spatially arranged and electrically interconnected.

Beamforming is a spatial filtering technique that comprises directional signal transmission or reception using an array of antenna elements. Directional transmission comprises directing radio energy through a radio channel towards a specific receiver. Directing radio energy may be performed by adjusting the phase and/or amplitude of transmitted signals such that the produced signal corresponds to a desired pattern. Directional reception comprises collecting signal energy from a specific transmitter. Collecting signal energy from a specific transmitter may be performed by changing a received signal in phase and amplitude such that the collected signal corresponds to a desired pattern.

Beam sweeping comprises covering a spatial area with a set of radio beams transmitted and received according to predetermined intervals and directions. Therefore, beam sweeping may comprise, for example, covering an angular area such as an angular sector by sweeping radio beams over the area.

A radio beam provided by an access node such as a gNodeB comprises information enabling for a terminal device to select the radio beam. For example, a radio beam may comprise a unique synchronization signal block beam ID (SSB ID) and a physical beam index (PBI). A synchronization signal block (SSB) is configured to provide time and frequency synchronization and basic information such as how a terminal device can access the system, indication of the physical cell ID and where to find the remaining configurations.

A terminal device is configured to scan and monitor SSB reference signals of a plurality of candidate radio beams and select the most suitable radio beam. The most suitable radio beam may be, for example, a radio beam with the strongest signal strength. Monitoring an SSB reference signal comprises measuring the signal strength of a radio beam detected within a predefined period. The terminal device is configured to identify and select a radio beam with the strongest signal strength.

A radio beam comprising an SSB may be referred to an SSB beam. SSB beams may be relatively wide such that a cell may be covered by few radio beams. A wide beam may be used in addition to enable connecting to a wireless network, as a basis for a beam refinement procedure in terms of triggering a beam sweep with narrow beams such as radio beams comprising a channel status information reference signal (CSI-RS) in the direction of the wide beam. A radio beam comprising a CSI-RS may be referred to as a CSI-RS beam.

A beamformed communication link between a terminal device and an access node is sensitive to blockages especially in the mmWave spectrum above 52.6 GHz, since most objects are opaque in that frequency range. Blockages may occur, for example, when the terminal device moves. To recover from blockages the terminal device and the access node often need to measure and re-align radio beams, but that is very power consuming as both the terminal device and the access node constantly sweep through potentially hundreds of radio beams every time a misalignment occurs. Radio beam misalignment may cause a performance loss due to a signal-to-noise ratio (SNR) drop or interference between users.

To enable access in the mmWave spectrum beyond 52.6 GHz, devices need to align their reception and transmission using beamforming. In an environment where most objects are opaque and mobility is pervasive, beamforming may comprise generating narrow transmit and receive beams, and re-tuning them often. However, there are problems with narrow beams in terms of a need for an access node to provide a large number of radio beams to ensure full coverage and thereby perform a plurality of reference symbol (RS) transmissions. This, in turn, introduces latency and requires a terminal device to perform a computationally heavy task to find the most suitable radio beam among possibly hundreds of radio beams. Another problem may be that a small displacement of the terminal device may cause a beam misalignment and trigger radio beam realignment procedures. Constantly re-aligning a transmission may spend a lot of resources.

Figure 2:
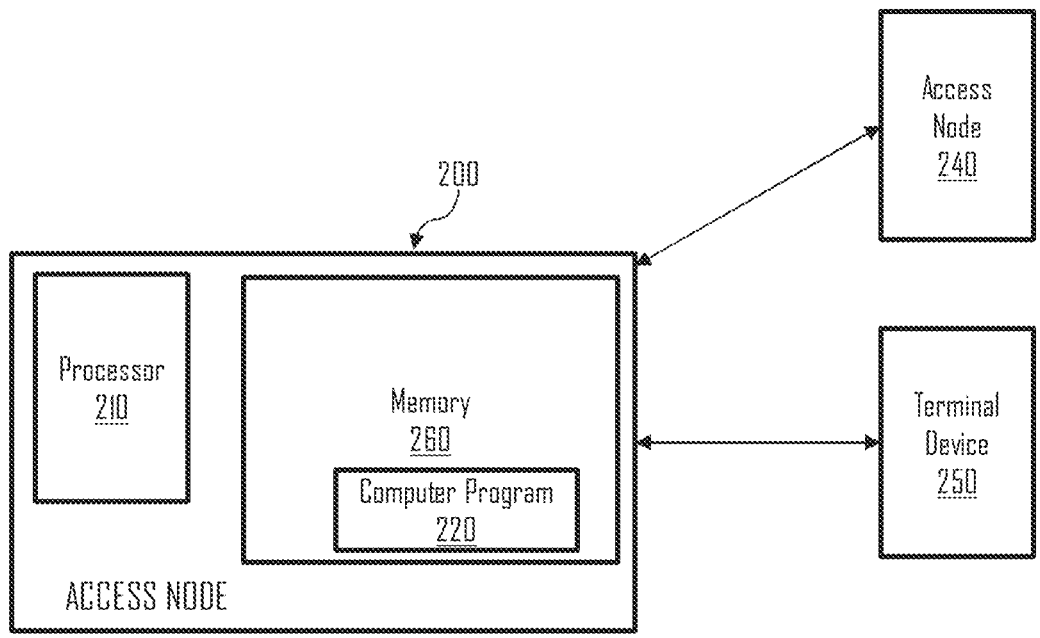
FIG. 2 shows a block diagram of an example device in which examples of the disclosed embodiments may be applied.

FIG. 2 is a block diagram depicting an apparatus 200 operating in accordance with an example embodiment of the invention. The apparatus 200 may be, for example, an electronic device such as a chip, chipset, an electronic module, a terminal device, a network function or an access node such as a base station. The apparatus comprises one or more control circuitry, such as at least one processor 210, and at least one memory 260, including one or more algorithms such as a computer program instructions 220 wherein the at least one memory 260 and the computer program instructions 220 are configured, with the at least one processor 210 to cause the apparatus 200 to carry out any of the example functionalities described below.

In the example of FIG. 2, the processor 210 is a central unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Universal Serial Bus (USB) stick, a Compact Disc (CD), a Compact Disc Read-Only Memory (CD-ROM), a Digital Versatile Disk (DVD) or a Blu-ray disk.

According to an example embodiment, the apparatus 200 comprises an access node. According to an example embodiment, an access node comprises a radio access network (RAN). A RAN may comprise a base station such as a gNodeB. According to another example embodiment, the apparatus 200 is operatively connected to an access node.

According to an example embodiment, the apparatus 200 is configured to operate on a predefined frequency band. According to an example embodiment, the apparatus 200 is configured to operate on a frequency band higher than 52.6 GHz. For example, the apparatus 200 may be configured to operate on a 64-71 GHz frequency range.

According to an example embodiment, the apparatus 200 is configured to communicate with a terminal device 250 and at least one access node 240. The terminal device 250 may comprise, for example, user equipment (UE) such as a mobile computing device and the at least one access node 240 may comprise a base station such as a gNodeB. The apparatus 200 is configured to communicate with the terminal device 250 by transmitting and receiving data using at least one radio beam.

According to an example embodiment, the apparatus 200 is configured to transmit at least one radio beam for providing an operation channel for the terminal device 250. According to an example embodiment, the at least one radio beam comprises at least one SSB beam. The at least one SSB beam comprises a synchronization signal block (SSB) associated with the at least one SSB beam. According to an example embodiment, the SSB comprises at least a primary synchronization signal (PSS) and a secondary synchronization signal (SSS). The PSS and SSS may be used for radio frame synchronization.

The terminal device 250 is configured to measure at least one metric relating to radio beam quality and at least one metric relating to radio beam positioning of the at least one radio beam provided by the apparatus 200. For example, assuming the terminal device 250 detects a first radio beam and a second radio beam, the terminal device 250 is configured to measure the at least one metric relating to radio beam quality and radio beam positioning of the first radio beam and of the second radio beam. According to an example embodiment, the at least one metric relating to beam quality comprises radio beam power and the metric relating to beam positioning comprises a propagation delay.

According to an example embodiment, the terminal device 250 is configured to select, based on at least one metric, the most suitable radio beam for serving the terminal device 250.

According to an example embodiment, the apparatus 200 is configured to receive from the terminal device 250 served by a first access node measurement data relating to a plurality of radio beams. A terminal device may comprise, for example, a mobile computing device such as a mobile phone. According to an example embodiment, a terminal device served by a first access node comprises a terminal device that camps on the first access node. According to an example embodiment, the apparatus 200 comprises the first access node configured to operate on a frequency band higher than 52.6 GHz. The first access node may comprise a base station such as a gNodeB.

According to an example embodiment, the plurality of radio beams comprises a plurality of radio beams covering adjacent angular areas. Radio beams covering adjacent angular areas may comprise radio beams covering angular sectors of a cell provided by an access node.

The measurement data may comprise measurement data measured by the terminal device 250 or a subset of the measurement data measured by the terminal device 250. A subset of the measurement data may comprise, for example, measurement data relating to the most suitable radio beams for serving the terminal device 250. The measurement data may comprise, for example, one or more metrics relating to properties of the plurality of radio beams.

According to an example embodiment, the measurement data comprises at least one metric relating to radio beam quality and at least one metric relating to radio beam positioning of the plurality of radio beams. Radio beam quality and radio beam positioning may be associated with each other such that the apparatus 200 receives measurement data relating to a radio beam as a pair.

According to an example embodiment, the at least one metric relating to radio beam quality comprises radio beam power and the at least one metric relating to radio beam positioning comprises a propagation delay.

According to an example embodiment, the metric relating to radio beam quality comprises received signal power. The received signal power may comprise, for example, a received signal strength indicator (RSSI) or reference signal received power (RSRP) of 3GPP specifications.

According to an example embodiment, the metric relating to a propagation delay comprises a timing advance (TA) of 3GPP specifications. A timing advance comprises a length of time that it takes for a signal to reach an access node from a terminal device. According to another example embodiment, the metric relating to a propagation delay comprises a time of arrival (TOA). A time of arrival comprises a length of time that it takes for a signal to reach a terminal device from an access node.

According to an example embodiment, the apparatus 200 is configured to determine that the measurement data comprises data relating to at least one radio beam provided by at least one second access node 240. The at least one second access node 240 may comprise, for example, a second base station such as a second gNodeB.

The apparatus 200 may be configured to determine that the measurement data comprises data relating to at least one radio beam provided by at least one second access node based on information associated with a radio beam. For example, the apparatus 200 may be configured to determine that the measurement data comprises data relating to at least one radio beam provided by the at least one second access node 240 in response to determining that the measurement data comprises at least one radio beam comprising an SSB from the second access node.

According to an example embodiment, the apparatus 200 is configured to receive information relating to angular coverage of the at least one radio beam provided by the at least one second access node 240. According to an example embodiment, angular coverage comprises a geographical area of a cell covered by a radio beam with a specific beamwidth and a specific angle. A specific angle may comprise a specific direction of the radio beam in azimuth and in elevation relative to a chosen coordinate system.

According to an example embodiment, the apparatus 200 is configured to determine, based on the information relating to angular coverage of the at least one radio beam, relative locations of radio beams provided by the second access node. For example, assuming the second access node transmits three radio beams, the apparatus 200 is configured to determine the relative locations of the three radio beams based on the information relating to angular coverage. In this way, the apparatus 200 may associate measurement data, received from the terminal device 250, relating to a particular radio beam with the relative location of the particular radio beam.

The apparatus 200 may be configured to send a request to the at least one second access node 240 for receiving information relating to angular coverage of the at least one radio beam provided by the at least one second access node 240. Alternatively, the apparatus 200 may be configured to receive information relating to angular coverage from a separate device operatively connected to the at least one second access node 240. According to an example embodiment, the apparatus 200 is configured to receive the information relating to angular coverage of the at least one radio beam in response to sending a request to the second access node 240.

Without limiting the scope of the claims, an advantage of receiving information relating to angular coverage of the at least one radio beam provided by the at least one second access node 240 is that the apparatus 200 may determine the relative locations of the at least one radio beam provided by the at least one second access node 240.

According to an example embodiment, the apparatus 200 is configured to determine, based on the angular coverage and the measurement data relating to the plurality of radio beams, an estimated location of the terminal device 250. According to an example embodiment, an estimated location comprises a coarse location of the terminal device. A coarse location may comprise a location estimate characterized by, for example, mean and variance, where the variance comprises large values such as in the order of several meters, or alternatively, a fraction of a diameter of a beam spread at a given distance from the access node.

Determining an estimated location of the terminal device 250 based on the information relating to angular coverage and the measurement data relating to the plurality of radio beams comprises determining the estimated position of the terminal device 250 with respect to radio beams provided by a first access node and with respect to radio beams provided by the second access node, and determining the estimated position of the terminal device 250 with respect to the first access node and the second access node.

According to an example embodiment, determining the estimated location of the terminal device 250 comprises determining the estimated location of the terminal device 250 with respect to the first access node and with respect to the at least one second access node. According to an example embodiment, the apparatus 200 is configured to determine the estimated location of the terminal device 250 with respect to the first access node and with respect to the at least one second access node based on a propagation delay from the terminal device 250 to the first access node and the propagation delay from the terminal device 250 to the at least one second access node.

According to an example embodiment, determining the estimated location of the terminal device with respect to the first access node comprises determining the estimated location of the terminal device 250 relative to a plurality of radio beams provided by the first access node. According to an example embodiment, the apparatus 200 is configured to determine the estimated location of the terminal device 250 relative to a plurality of radio beams provided by the first access node based on the measurement data received from the terminal device 250. According to an example embodiment, the apparatus 200 is configured to determine based on received signal power which of the radio beams provided by the first access node is closest to the terminal device 250 being served by the most suitable radio beam.

According to an example embodiment, determining the estimated location of the terminal device with respect to the at least one second access node comprises determining the estimated location of the terminal device 250 relative to radio beams provided by the at least one second access node. According to an example embodiment, the apparatus 200 is configured to determine the estimated location of the terminal device 250 relative to a plurality of radio beams provided by the at least one second access node based on the measurement data and angular coverage received from the terminal device 250. As mentioned above, angular coverage of the at least one radio beam provided by the at least one second access node may be used for associating received measurement data with the relative locations of the at least one radio beam provided by the at least one second access node. According to an example embodiment, the apparatus 200 is configured to determine based on received signal power which of the radio beams provided by the at least one second access node is closest to the terminal device 250 being served by the most suitable radio beam.

In other words, information from both the first access node and the at least one second access node may be used for estimating the location of the terminal device 250. Received signal power may be utilized for determining the estimated location of the terminal device 250 relative to radio beams provided by an access node and the propagation delay may be utilized for determining the estimated distance of the terminal device 250 from an access node.

An estimated location of the terminal device 250 may comprise an estimated location of the terminal device 250 within a radio beam used for serving the apparatus 200 or with respect to a radio beam used for serving the apparatus 200.

Without limiting the scope of the claims, an advantage of estimating the location of the terminal device may be that at least one beam provided by a serving access node may be refined based on the estimated location. Refining a beam may comprise, for example, sweeping a narrower radio beam over a narrower range. A narrower range may comprise a range that is narrower than the range of the most suitable radio beam serving the terminal device. This enables speeding up a beam alignment process between a terminal device and an access node and reduces the risk of interference.

According to an example embodiment, the apparatus 200 is configured to select a set of radio beams for provision to the estimated location of the terminal device 250, wherein the set of radio beams comprises a subset of radio beams provided by the first access node for serving the terminal device 250.

The subset of radio beams may comprise a set of radio beams provided within a sector that is narrower than the sector of the most suitable radio beam serving the terminal device 250.

The apparatus 200 may be configured to select the set of radio beams based on topology. For example, the apparatus 200 may be configured to receive information relating to obstacles and/or blockages in the network and select the set of radio beams such that the obstacles/blockages may be avoided.

Without limiting the scope of the claims, an advantage of selecting a set of radio beams for provision to the estimated location of the terminal device 250 is that the angular space in which the terminal device 250 measures the first access node is reduced thereby speeding up radio beam alignment between the terminal device 250 and the first access node.

According to an example embodiment, the apparatus 200 is configured to schedule provision of the set of radio beams to the estimated location of the terminal device. According to an example embodiment, the set of radio beams comprises a set of narrow radio beams such as a radio beam comprising a channel state information reference signal (CSI-RS). The terminal device 250 is configured to select the most suitable radio beam from the set of radio beams and the apparatus 200 is configured to monitor the quality of the selected radio beam.

The apparatus 200 may be configured to switch from providing a set of radio beams to providing a full beams sweep. According to an example embodiment, the apparatus 200 is configured to, in response to receiving information that the quality of the set of beams is below a predetermined threshold level, provide a full beam sweep.

In should be noted that the terminal device 250 may also be connected to a network via a plurality of access nodes to, for example, alleviate intercell interference (ICI) using multiple transmit and receive points (multi-TRP). For example, a terminal device at a cell edge may be served by multi-TRPs to improve its signal transmission and/or reception.

Similarly to the examples above, in a multi-TRP scenario, the apparatus 200 is configured to receive from the terminal device 250 served by a first access node measurement data relating to a plurality of radio beams and determine that the measurement data comprises data relating to at least one radio beam provided by at least one second access node 240.

According to an example embodiment, the apparatus 200 is further configured to receive information relating to angular coverage of the at least one radio beam provided by the at least one second access node 240 and determine, based on the angular coverage and the measurement data relating to the plurality of radio beams, an estimated location of the terminal device 250.

According to an example embodiment, in a multi-TRP scenario, the apparatus 200 is configured to select a plurality of sets of radio beams for provision to the estimated location of the terminal device 250, wherein the plurality of sets of radio beams comprises a subset of radio beams provided by the first access node and a subset of radio beams provided by the second access node 240 for serving the terminal device 250. The apparatus 200 is further configured to inform the second access node 240 of the subset of radio beams to be provided by the second access node 240 to the terminal device 250.

According to an example embodiment, the apparatus 200 is configured to schedule transmissions of the subsets of radio beams to the terminal device 250.

Referring back to FIG. 2, the terminal device 250 comprises one or more control circuitry, such as at least one processor, and at least one memory, including one or more algorithms such as a computer program instructions wherein the at least one memory and the computer program instructions are configured, with the at least one processor to cause the terminal device 250 to carry out any of the example functionalities described below.

According to an example embodiment, the terminal device 250 is configured to measure signals relating to a plurality of radio beams. The plurality of radio beams may comprise a plurality of radio beams provided by a plurality of access nodes. For example, the plurality of radio beams may comprise one or more radio beams provided by a first access node and one or more radio beams provided by a second access node.

According to an example embodiment, the terminal device 250 is configured to determine based on the measured signals at least one metric relating to radio beam quality and at least one metric relating to radio beam positioning of radio beams detected by the terminal device 250.

For example, assuming the terminal device 250 detects two radio beams, the terminal device 250 is configured to determine the at least one metric relating to radio beam quality and radio beam positioning for each of the two radio beams. According to an example embodiment, the at least one metric relating to radio beam quality comprises radio beam power and the metric relating to radio beam positioning comprises propagation delay.

According to an example embodiment, the apparatus 200 is configured to determine the metric relating to a propagation delay by processing the PSS and SSS of an SSB associated with a radio beam.

According to an example embodiment, the terminal device 250 is configured to transmit a set of data relating to the plurality of radio beams to at least one access node. The set of data relating to the plurality of radio beams may comprise at least one metric relating to radio beam quality and at least one metric relating to radio beam positioning of radio beams detected by the terminal device 250. According to an example embodiment, the at least one metric relating to radio beam quality comprises radio beam power and the metric relating to radio beam positioning comprises propagation delay.

According to an example embodiment, the terminal device 250 is configured to estimate a direction of arrival path of radio beams provided by the at least one access node. Estimating a direction of arrival path of radio beams may comprise, for example, by switching receive beams until captured energy is the highest or estimating the multipath components' complex gains.

According to an example embodiment, the terminal device 250 is configured to select a subset of radio beams provided by the at least one access node.

According to an example embodiment, the apparatus 200 comprises means for performing features of the apparatus 200, wherein the means for performing comprises at least one processor 210, at least one memory 260 including computer program code 220, the at least one memory 260 and the computer program code 220 configured to, with the at least one processor 210, cause the performance of the apparatus 200. The means for performing features of the apparatus 200 may comprise, for example, means for receiving from a terminal device served by a first access node measurement data relating to a plurality of radio beams, means for determining that the measurement data comprises data relating to at least one radio beam provided by at least one second access node, means for receiving information relating to angular coverage of the at least one radio beam provided by the at least one access node, means for determining, based on the angular coverage and the measurement data relating to the plurality of radio beams, an estimated location of the terminal device, and means for selecting, a set of radio beams for provision to the estimated location of the terminal device, wherein the set of radio beams comprises a subset of radio beams provided by the first access node for serving the terminal device.

The apparatus 200 may further comprise means for, in response to receiving information that the quality of the set of beams is below a predetermined threshold level, providing a full beam sweep.

According to an example embodiment, the terminal device 250 comprises means for performing features of the terminal device 250, wherein the means for performing comprises at least one processor, at least one memory including computer program code, the at least one memory and the computer program code configured to, with the at least one processor, cause the performance of the terminal device 250. The means for performing features of the terminal device 250 may comprise, for example, means for measuring signals relating to a plurality of radio beams, means for transmitting a set of data relating to the plurality of radio beams to at least one access node, means for estimating a direction of an arrival path of radio beams provided by the at least one access node, and means for selecting a subset of radio beams provided by the at least one access node.

Figure 3:
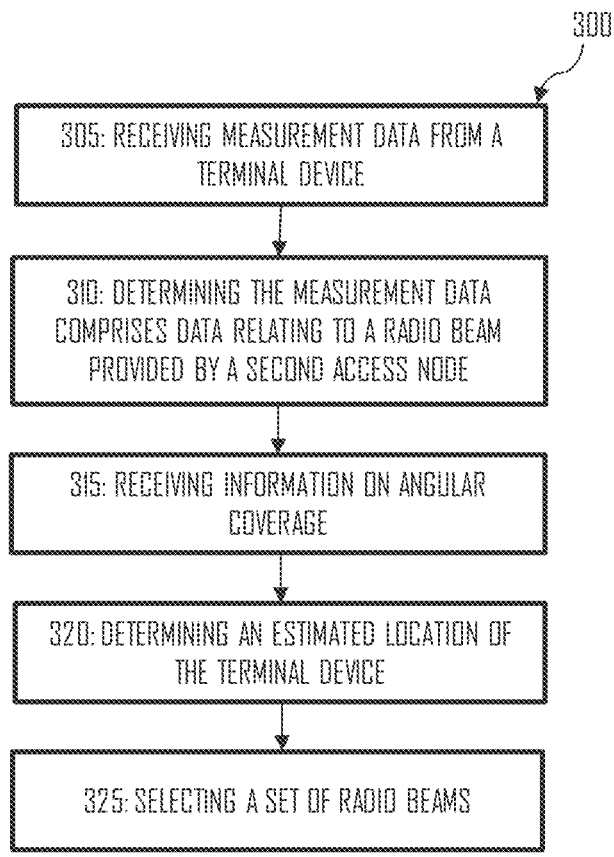
FIG. 3 illustrates an example method according to an example embodiment of the invention.

FIG. 3 illustrates an example method 300 incorporating aspects of the previously disclosed embodiments. More specifically the example method 300 illustrates selecting a set of radio beams for provision to an estimated location of a terminal device 250. The method may be performed, for example, by the apparatus 200 comprised by a first access node or operatively connected to the first access node.

The method starts with receiving 305 from a terminal device 250 served by a first access node measurement data relating to a plurality of radio beams. The plurality of radio beams comprises a plurality of radio beams covering adjacent angular areas.

In the example of FIG. 3, the measurement data comprises at least one metric relating to radio beam quality and at least one metric relating to radio beam positioning of the plurality of radio beams. The at least one metric relating to radio beam quality comprises radio beam power and the at least one metric relating to radio beam positioning comprises propagation delay. Radio beam power may comprise received signal power such as RSSI or RSRP, and propagation delay may comprise, for example, a timing advance or time of arrival.

The measurement data may comprise the measurement data measured by the terminal device 250 or a subset of the measurement data measured by the terminal device 250. A subset of the measurement data may comprise, for example, measurement data relating to the most suitable radio beams.

The method continues with determining 310 that the measurement data comprises data relating to at least one radio beam provided by at least one second access node.

In the example of FIG. 3, the measurement data comprises a synchronization signal block (SSB) associated with a radio beam provided by the at least one second access node. According to an example embodiment, the SSB comprises at least a primary synchronization signal (PSS) and a secondary synchronization signal (SSS). The PSS and SSS may be used for radio frame synchronization.

The method further continues with receiving 315 information relating to angular coverage of the at least one radio beam provided by the at least one second access node.

Receiving information relating to angular coverage may comprise receiving the information in response to requesting the information from the at least one second access node or receiving the information relating to angular coverage from a separate device operatively connected to the at least one second access node.

The method further continues with determining 320, based on the angular coverage and the measurement data relating to the plurality of radio beams, an estimated location of the terminal device 250.

In the example of FIG. 3, determining the estimated location of the terminal service 250 comprises determining the estimated location of the terminal device with respect to the first access node and with respect to the at least one second access node. Determining the estimated location of the terminal device 250 with respect to the first access node comprises determining the estimated location of the terminal device relative to a plurality of radio beams provided by the first access node. Determining the estimated location of the terminal device 250 with respect to the at least one second access node comprises determining the estimated location of the terminal device 250 relative to radio beams provided by the first access node.

The method further continues with selecting 325 a set of radio beams for provision to the estimated location of the terminal device 250, wherein the set of radio beams comprises a subset of radio beams provided by the first access node for serving the terminal device 250.

Figure 4:
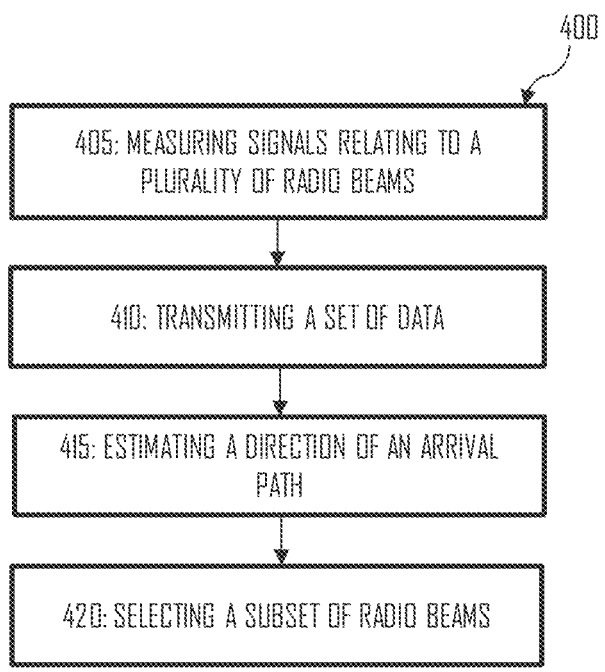
FIG. 4 illustrates another example method according to an example embodiment of the invention.

FIG. 4 illustrates another example method 400 incorporating aspects of the previously disclosed embodiments. More specifically the example method 300 illustrates selecting a subset of radio beams provided by at least one access node. The method may be performed, for example, by the terminal device 250.

The method starts with measuring 405 signals relating to a plurality of radio beams. The terminal device 250 is configured to determine, based on the measured signals, at least one metric relating to radio beam quality and at least one metric relating to radio beam positioning of radio beams detected by the terminal device 250. According to an example embodiment, the at least one metric relating to radio beam quality comprises radio beam power and the metric relating to radio beam positioning comprises propagation delay.

The method continues with providing 410 a set of data relating to the plurality of radio beams to at least one access node. The set of data may comprise the determined metrics or a subset of the determined metrics.

The method further continues with estimating 415 a direction of arrival path of radio beams provided by the at least one access node. Estimating a direction of arrival path of radio beams may comprise, for example, by switching receive beams until captured energy is the highest or estimating the multipath components' complex gains.

The method further continues with selecting 420 a subset of radio beams provided by the at least one access node. Selecting a subset of radio beams may comprise collecting signal energy from a specific transmitter.

Figure 5:
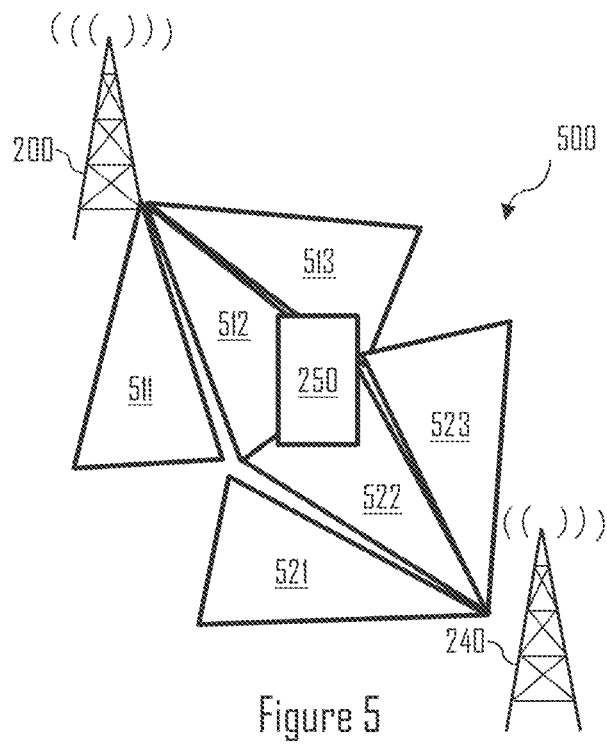
FIG. 5 illustrates an example system according to an example embodiment of the invention.

FIG. 5 illustrates an example system incorporating aspects of the previously disclosed embodiments. More specifically the example system 500 illustrates estimating a location of the terminal device 250.

In the example of FIG. 5, a first access node 200 is configured to provide radio beams 511, 512 and 513 and a second access node 240 is configured to provide radio beams 521, 522 and 523. In the example of FIG. 5, it is assumed that the apparatus 200 is comprised by the first access node 200.

The terminal device 250 is configured to measure signals relating to radio beams 511,512, 513, 521, 522 and 523. Based on the measured signals, the terminal device is configured to determine that radio beam 512 is the most suitable one and camps on the first access node 200.

The terminal device 250 is configured to provide measurement data relating to the plurality of radio beams 511, 512, 513, 521, 522 and 523 to the first access node 200. The measurement data comprises at least one metric relating to radio beam quality and at least one metric relating to radio beam positioning of the plurality of radio beams. In the example of FIG. 5, the at least one metric relating to radio beam quality comprises radio beam power such as received signal power and the at least one metric relating to radio beam positioning comprises a propagation delay such as a timing advance or time of arrival.

The first access node 200 is configured to determine that the measurement data received from the terminal device 250 comprises data relating to radio beams 521, 522 and 523 provided by the second access node 240 and receive angular coverage of the radio beams 521, 522 and 523 from the second access node 240.

The first access node 200 is configured to determine an estimated location of the terminal device 250 relative to the radio beams 511, 512 and 513 provided by the first access node 200. For example, the first access node 200 may be configured to compare the received signal power of the most suitable radio beam 512 to radio beams 511 and 513, and determine based on the comparison that the terminal device 250 is closer to the radio beam 513 than the radio beam 511. For example, in response to determining that the received signal power of the radio beam 513 is higher than the received signals power of the radio beam 511, the first access node 200 may determine that the terminal device 250 is closer to the radio beam 513 than the radio beam 511.

Similarly, the first access node 200 is configured to determine an estimated location of the terminal device 250 relative to the radio beams 521, 522 and 523 provided by the second access node 240. For example, the first access node 200 may be configured to compare the received signal power of the radio beams 521, 522 and 523, and determine based on the comparison that the terminal device 250 is closer to the radio beam 523 than the radio beam 521. For example, in response to determining that the received signal power of the radio beam 523 is higher than the received signals power of the radio beam 521, the first access node 200 may determine that the terminal device 250 is closer to the radio beam 523 than the radio beam 521.

Based on the estimated location of the terminal device 250 relative to the radio beams 511, 512 and 513 provided by the first access node 200, the estimated location of the terminal device 250 relative to the radio beams 521, 522 and 523 provided by the second access node 240, and a propagation delay from the first access node 200 to the terminal device 250 and the propagation delay from the second access node 240 to the terminal device, the first access node 200 may determine an estimated location of the terminal device 250. The first access node 200 may then select a subset of radio beams within the radio beam 512 for providing to the estimated location of the terminal device 250.

Figure 6:
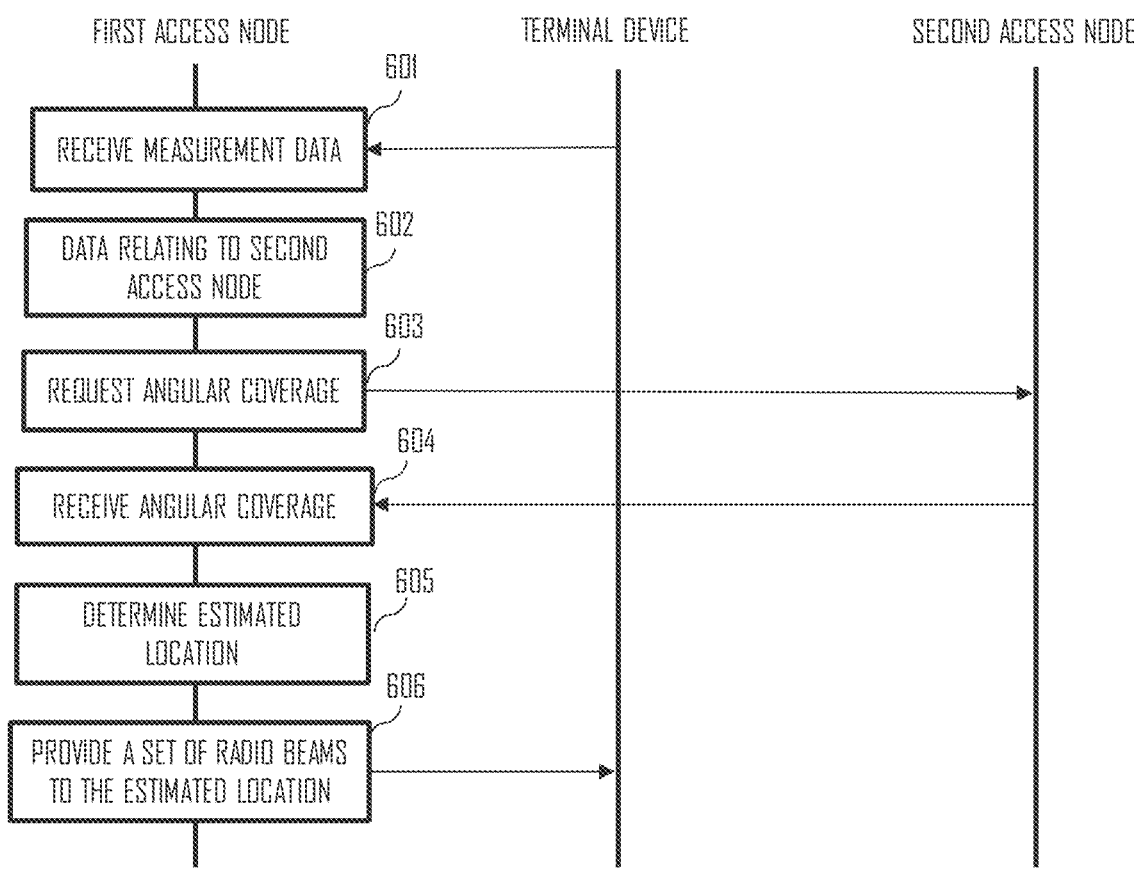
FIG. 6 illustrates an example signaling diagram according to an example embodiment of the invention.

FIG. 6 illustrates an example signaling diagram incorporating aspects of the previously disclosed embodiments. In the example of FIG. 6, it is assumed that the first access node comprises the apparatus 200.

In the example of FIG. 6, the first access node receives 601 from a terminal device served by the first access node measurement data relating to a plurality of radio beams. In the example of FIG. 6, the measurement data comprises at least one metric relating to radio beam quality and at least one metric relating to radio beam positioning of the plurality of radio beams. Radio beam quality and radio beam positioning may be associated with each other such that the first access node receives measurement data relating to a radio beam as a pair of the metrics. The at least one metric relating to radio beam quality comprises radio beam power and the at least one metric relating to radio beam positioning comprises a propagation delay.

The first access node determines 602 that the measurement data comprises data relating to at least one radio beam provided by at least one second access node. The first access node may be configured to determine that the measurement data comprises data relating to at least one radio beam provided by the at least one second access node in response to determining that the measurement data comprises at least one radio beam comprising an SSB from the second access node.

The first access node requests 603 information relating to angular coverage of the at least one radio beam provided by the second access node.

The first access node receives 604 information relating to angular coverage of the at least one radio beam provided by the second access node. The first access node is configured to determine, based on the information relating to angular coverage of the at least one radio beam, relative locations of radio beams provided by the second access node.

The first access node determines, 605 based on the angular coverage and the measurement data relating to the plurality of radio beams, an estimated location of the terminal device. Determining the estimated location of the terminal device comprises determining the estimated location of the terminal device with respect to the first access node and the at least one second access node, relative to a plurality of radio beams provided by the first access node and relative to radio beams provided by the at least one second access node.

The first access node selects 606 a set of radio beams for provision to the estimated location of the terminal device, wherein the set of radio beams comprises a subset of radio beams by provided by the first access node for serving the terminal device.

Figure 7A:
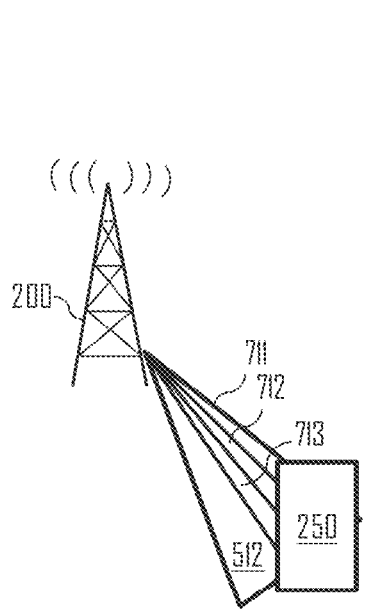
FIG. 7A illustrates another example system according to an example embodiment of the invention.
Figure 7B:
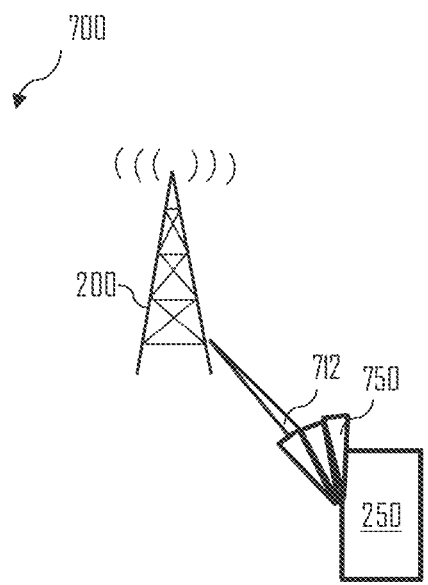
FIG. 7B illustrates yet another example system according to an example embodiment of the invention.

FIGS. 7A and 7B illustrates an example system incorporating aspects of the previously disclosed embodiments. More specifically the example system 700 illustrates selecting a set of radio beams for provision to the estimated location of the terminal device 250, wherein the set of radio beams comprises a subset of radio beams provided by the first access node for serving the terminal device 250 and selecting a radio beam within the set of radio beams by the terminal device.

In the example of FIG. 7A, the estimated location of the terminal device 250 is determined by the apparatus 200. The apparatus 200 is configured to select a set of radio beams 711, 712 and 713 for provision to the estimated location of the terminal device. In the example of FIG. 7, the set of radio beams 711, 712, 713 comprises a subset of the radio beam 512 provided by the first access node.

In the example of 7B, the terminal device 250 is configured to select the most suitable radio beam within the subset of radio beams 711, 712, 713. In the example of FIG. 7B, the terminal device selects the radio beam 712 using directional reception 750.

Without limiting the scope of the claims, an advantage of determining an estimated location of the terminal device within a coverage of a radio beam is that a limited set of radio beams may be provided for the terminal device. Another advantage is that the number of measurements performed by a terminal device and an access node and the number or re-alignments of radio beams is reduced.

Without in any way limiting the scope, interpretation, or application of the claims appearing below, a technical effect of one or more of the example embodiments disclosed herein is that beam alignment process may be performed faster and the risk of interference may be reduced. Another technical effect is that a terminal device and an access node may faster recover from blockages. A further technical advantage is that power consumption may be reduced.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. A terminal device comprising at least one processor and at least one memory including computer program code, the at least one memory and the computer program code configured to with the at least one processor, cause the terminal device at least to:

measure signals relating to a plurality of radio beams;
determine, based on the measured signals, at least one metric relating to radio beam quality and at least one metric relating to radio beam positioning of radio beams, wherein the at least one metric relating to radio beam quality includes radio beam power and the at least one metric relating to radio beam positioning includes propagation delay, wherein radio beam power includes received signal power such as a received signal strength indicator (RSSI) or a reference signal received power (RSRP), and propagation delay includes a timing advance or time of arrival;

transmit a set of data relating to the plurality of radio beams to at least one access node, wherein the set of data includes the at least one metric relating to radio beam quality and the at least one metric relating to radio beam positioning of radio beams;

estimate a direction of an arrival path of radio beams provided by the at least one access node, wherein estimating the direction of the arrival path includes switching receive beams until captured energy is the highest, and estimating a complex gain of one or more multipath components; and select a subset of radio beams provided by the at least one access node, wherein selecting the subset of radio beams includes collecting signal energy from a specified transmitter, wherein the terminal device is served by a first access node, wherein the measurement data comprises a synchronization signal block (SSB) associated with a radio beam provided by at least one second access node, wherein the SSB comprises at least a primary synchronization signal (PSS) and a secondary synchronization signal (SSS), and wherein the PSS and SSS are used for radio frame synchronization.

* * * * *